United States Patent
Boufounos et al.

(10) Patent No.: US 9,638,801 B2
(45) Date of Patent: May 2, 2017

(54) DEPTH SENSING USING OPTICAL PULSES AND FIXED CODED APERATURE

(71) Applicant: Mitsubishi Electric Research Laboratories, Inc., Cambridge, MA (US)

(72) Inventors: Petros T. Boufounos, Arlington, MA (US); Achuta Kadambi, Cambridge, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 123 days.

(21) Appl. No.: 14/551,394

(22) Filed: Nov. 24, 2014

(65) Prior Publication Data

US 2016/0146595 A1    May 26, 2016

(51) Int. Cl.
G01C 11/12   (2006.01)
G01S 17/89   (2006.01)
G01S 17/10   (2006.01)
G01S 7/486   (2006.01)

(52) U.S. Cl.
CPC .............. *G01S 17/89* (2013.01); *G01S 7/4865* (2013.01); *G01S 17/10* (2013.01)

(58) Field of Classification Search
CPC .............. G01B 11/2513; G01B 11/254; G01B 11/2545; G01B 11/24; G01B 11/25; G01B 11/2509; G01B 2210/52; G01B 11/002; G01B 11/22; G02B 27/0075; G02B 5/005; G02B 2027/0134; G02B 2027/0138; G02B 2027/01
See application file for complete search history.

(56) References Cited

U.S. PATENT DOCUMENTS

| | | | | |
|---|---|---|---|---|
| 8,896,594 | B2* | 11/2014 | Xiong | H04N 13/0271 345/419 |
| 2012/0075423 | A1 | 3/2012 | Kirmani et al. | |
| 2013/0044213 | A1 | 2/2013 | Kirmani et al. | |
| 2013/0088726 | A1 | 4/2013 | Goyal et al. | |
| 2013/0315501 | A1* | 11/2013 | Atanassov | G06T 5/001 382/275 |
| 2014/0132722 | A1* | 5/2014 | Martinez Bauza | G01B 11/25 348/46 |
| 2014/0380115 | A1* | 12/2014 | Bar-On | H04B 10/80 714/758 |

(Continued)

OTHER PUBLICATIONS

Ahmed Kirmani, Andrea Colaço, Franco N. C. Wong, and Vivek K. Goyal, "Exploiting sparsity in time-of-flight range acquisition using a single time-resolved sensor," Opt. Express, vol. 19, No. 22, pp. 21485-21507, Oct. 2011.

(Continued)

*Primary Examiner* — Michael P Stafira
(74) *Attorney, Agent, or Firm* — Gene Vinokur; James McAleenan; Hironori Tsukamoto (57) ABSTRACT

In a system and method for reconstructing a scene, a light source transmits an optical pulse unto the scene, and a set of sensors receive a reflected pulse to acquire sensed signals corresponding to the optical pulse. There is a fixed coded aperture in an optical path between the light source and set of sensors. Then, a processor performs a method to reconstruct the scene as a three-dimensional (3D) depth map using a scene model.

27 Claims, 7 Drawing Sheets

(56) References Cited

U.S. PATENT DOCUMENTS

2015/0371393 A1* 12/2015 Ramachandra ....... G06T 7/0055
382/154
2015/0371434 A1* 12/2015 Nash ................ G06K 19/06037
359/558

OTHER PUBLICATIONS

Ahmed Kirrnani, Andrea Colaço, Franco NC Wong, and Vivek K Goyal, "CoDAC: a compressive depth acquisition camera framework," in IEEE Int. Conf. Acoustics, Speech and Signal Processing (ICASSP). IEEE, 2012, pp. 5425-5428.

Chinmay Hegde, Piotr Indyk, and Ludwig Schmidt, "Approximation-tolerant model-based compressive sensing," in Proc. ACM Symposium on Discrete Algorithms (SODA). SIAM, Jan. 2014, pp. 1544-1561.

* cited by examiner

Algorithm 1 Model-based CoSaMP

1: Initialize: Iteration count $l = 0$, Initial estimate $\widetilde{\mathbf{s}}^l = \mathbf{0}$
2: while not converged do
3:   Increase iteration count: $l \leftarrow l + 1$
4:   Compute residual: $\mathbf{u}^l = \mathbf{r} - \mathbf{A}(\widetilde{\mathbf{s}}^{l-1})$
5:   Compute proxy (gradient): $\mathbf{g}^l = \mathbf{A}^*(\mathbf{u}^l)$
6:   Identify support candidate: $\mathcal{T}^l = \text{supp}(\text{trunc}(\mathbf{g}^l, K)) \cup \text{supp}(\widetilde{\mathbf{s}}^{l-1})$
7:   Invert over support candidate: $\mathbf{b}^l = \mathbf{A}_{\mathcal{T}}^\dagger(\mathbf{r})$
8:   Truncate and update: $\widetilde{\mathbf{s}}^l = \text{trunc}(\mathbf{b}^l, K)$
9: end while
10: return Scene estimate: $\widetilde{\mathbf{s}}$

*Fig. 4*

Algorithm 2 Model-based IHT

310 — 1: Initialize: Iteration count $l = 0$, Initial estimate $\widetilde{\mathbf{s}}^l = \mathbf{0}$ 2: while not converged do

320 — 3:     Increase iteration count: $l \leftarrow l + 1$

330 — 4:     Compute residual: $\mathbf{u}^l = \mathbf{r} - \mathbf{A}(\widetilde{\mathbf{s}}^{l-1})$ 5:     Compute proxy (gradient): $\mathbf{g}^l = \mathbf{A}^*(\mathbf{u}^l)$ 6:     Follow gradient: $\widehat{\mathbf{s}}^l = \widetilde{\mathbf{s}}^{l-1} - \tau \mathbf{g}^l$ 340 — 7:     Truncate according to model: $\widetilde{\mathbf{s}}^l = \mathrm{trunc}(\widehat{\mathbf{s}}^l, K)$ 8: end while

9: return Scene estimate: $\widetilde{\mathbf{s}}^l$

*Fig. 5*

DEPTH SENSING USING OPTICAL PULSES AND FIXED CODED APERATURE

RELATED APPLICATION

This Application is a related to U.S. patent application Ser. No. 13/405,504, "Depth Sensing Using Active Coherent Signals," filed by Boufounos on Feb. 27, 2012, and incorporated herein by reference. That Application provides a method for sensing depths in a scene using active coherent sensing of reflected radar pulses using a single transmitter and multiple receivers arranged in a plane, using back projection.

FIELD OF THE INVENTION

This invention relates generally to reconstructing a scene using optical pulses, and more particularly to reconstructing the scene as a three dimensional (3D) depth map.

BACKGROUND OF THE INVENTION

Compressive Sensing

Compressive Sensing (CS) uses fewer linear measurements than implied by the dimensionality of an acquired signal. To reduce the acquisition rate, CS reconstruction methods exploit the structure of signals. To capture the structure, the most commonly used signal model is sparsity.

As used herein, sparse is a well known term of art in signal processing, and not a relative indefinite term. A "sparse" approximation estimates a sparse vector, i.e., a vector with most coefficients equal or approximately equal to zero, satisfying a linear system of equations given highdimensional measured data and an acquisition matrix.

A CS-based acquisition system can be model as $$r = A(s) \qquad (1)$$

where $A(\cdot)$ is a linear function, s is in some appropriate signal space, and r is in a measurement space. The measurement space has a much lower dimension than the signal space. A number of possible properties of $A(\cdot)$, such as low coherence, the restricted isometry property, depending on the model, guarantee that the reconstruction is possible using an appropriate method.

CS is successfully applied in many imaging systems, in which, typically, the signal s to be acquired is a 2D image in $\mathbb{R}^{N_x \times N_y}$.

Using compressive sensing approaches, it has been shown that images can be acquired with measurements as few as 10% of the number of pixels $N_x N_y$. These gains are not as relevant in conventional visible-light imaging, where charge-coupled devices and metal-oxide-semiconductor sensor technology make measurements extremely inexpensive, which has had a significant impact in other modalities, such as medical imaging, low-light imaging, hyperspectral imaging, and depth sensing. However, the gains are significant for imaging systems that depend on complex costly sensors, such as "time-of-flight" (TOF) light or radar sensors.

Model-Based Compressive Sensing

A model-based CS framework provides a general approach to developing a large number of signal models and characterizing their suitability for CS acquisition. Models under this framework are created by imposing restrictions on the signal support. A fundamental operation is the projection of a general signal to the set of signals that satisfy support constraints on the model. As long as such a projection can be computed, common greedy CS reconstruction methods, such as Compressive SAmpling Matching Pursuit (CoSaMP) and Iterative Hard Thresholding (IHT), can be modified to reconstruct signals in the model. Furthermore, it has been shown that a pair of approximate projections with different approximation properties is sufficient to guarantee accurate reconstruction, instead of an exact projection, see Hegde et al., "Approximation-tolerant model-based compressive sensing," Proc. ACM Symposium on Discrete Algorithms (SODA). SIAM, pp. 1544-1561, January 2014.

One signal model, approximation tolerant model-based compressive sensing, is motivated by signals measured using 2D seismic imaging. A signal $s \in \mathbb{R}^{N \times T}$ according to that model is a matrix with N rows and T columns. Each row of the signal only has S non-zero entries, which are spatially close to the S non-zero entries of the row above or below. This is enforced by restricting an earth-mover distance (EMD) between the support of subsequent rows of the signal. The projection under the approximation tolerant model is performed by solving a sequence of network flow problems.

Optical Sensing

Optical sensing measures distances to a scene by illuminating the scene with optical signal and analyzing the reflected light. One optical sensing technique, e.g., light radar (Lidar), can be used with applications such as geoscience, remote sensing, airborne laser swath mapping (ALSM), laser altimetry, contour mapping, and vehicle navigation.

Conventional high-resolution, high frame-rate optical based systems typically use an expensive array of precision TOF sensors and illuminate the scene with singular pulses transmitted by a stationary laser. Alternatively, at the expense of reduced frame-rate, the laser scans the scene. A smaller sensor array, which can also scan the scene, acquires the reflection. The resulting system significantly lowers the cost, but requires the use of mechanical components, which can be prone to failure and cumbersome in mobile applications.

Compressive sensing can exploit significant gains in computational power due to the reduced sensing cost, and allow elaborate signal models and reconstruction methods, which, in turn, enable reduced sensor complexity. For example, some compressive depth sensing systems use a single sensor combined with a spatial light modulator and multiple pulses illuminating the scene.

A spatial light modulator is used to implement a variable coded aperture that changes with every pulse. However, that restricts those system to static scenes, see Howland et al., "Compressive Sensing Lidar for 3D imaging," CLEO: Science and Innovations. Optical Society of America, 2011, CMG3, Kirmani et al., "Exploiting sparsity in time-of-flight range acquisition using a single time-resolved sensor," Opt. Express, vol. 19, no. 22, pp. 21485-21507, October 2011, and Kirmani et al., "CoDAC: a compressive depth acquisition camera framework," IEEE Int. Conf. Acoustics, Speech and Signal Processing (ICASSP). IEEE, 2012, pp. 5425-5428, and U.S. 20130088726. In addition, spatial light modulators (SLM) are relative expensive, e.g., $1000 or more depending on the desired resolution, see Holoeye® or Texas Instruments DLP® products.

With S=1, a restricted version of the above approximation tolerant model is a good model for 2D imaging (one spatial and one depth dimension) with light pulses as the model minimizes a 1-D total variation of the depth map. However, to extend the model to 3-D volumes, i.e., signals $s \in \mathbb{R}^{N_x \times N_y \times T}$ (two spatial and one depth dimension) is unfortunately not obvious.

SUMMARY OF THE INVENTION

Continuous improvement in optical sensing components, as well as recent advances in signal acquisition theory, provide an opportunity to reduce the cost and enhance the capabilities of depth sensing systems. The embodiments of the invention provide a novel depth sensing system and method that uses a fixed coded aperture (mask) to significantly reduce the number of required sensors, compared to conventional systems. As an advantage, the mask can be cheaply printed on any transparent substrate.

The embodiments also provide a modeling and reconstruction framework based on model-based compressed sensing, which characterizes a large variety of depth sensing systems. Experimental data indicate that it is possible to reduce the number of sensors by more than 85% with a negligible effect on the sensing quality.

The main contributions of the invention include:
- a real-time compressive hardware architecture for light-based time-of-flight (TOF) depth sensors;
- a very general system model that characterizes a large number of depth sensing system architectures; and
- a model-based compressive sensing (CS) reconstruction method that exploits a low variation (TV) of depth scenes to improve the reconstruction.

In contrast with the prior art, the embodiments use a small number of sensors and a fixed coded aperture. The aperture is a very inexpensive component compared to a spatial light modulator (SLM). Because the code does not change, one embodiment of the invention only requires a single pulse transmission per frame—that is a depth map in a sequence of depth maps—which may or may not carry a code. Thus, frame-rates equivalent to much more expensive single-pulse systems can be achieved at a significantly lower cost.

DETAILED DESCRIPTION OF THE PREFERRED EMBODIMENT

The embodiments of our invention provide a method and system for reconstructing a scene using optical sensing and a fixed coded aperature.

Optical Sensing
System Architecture

Figure 1:
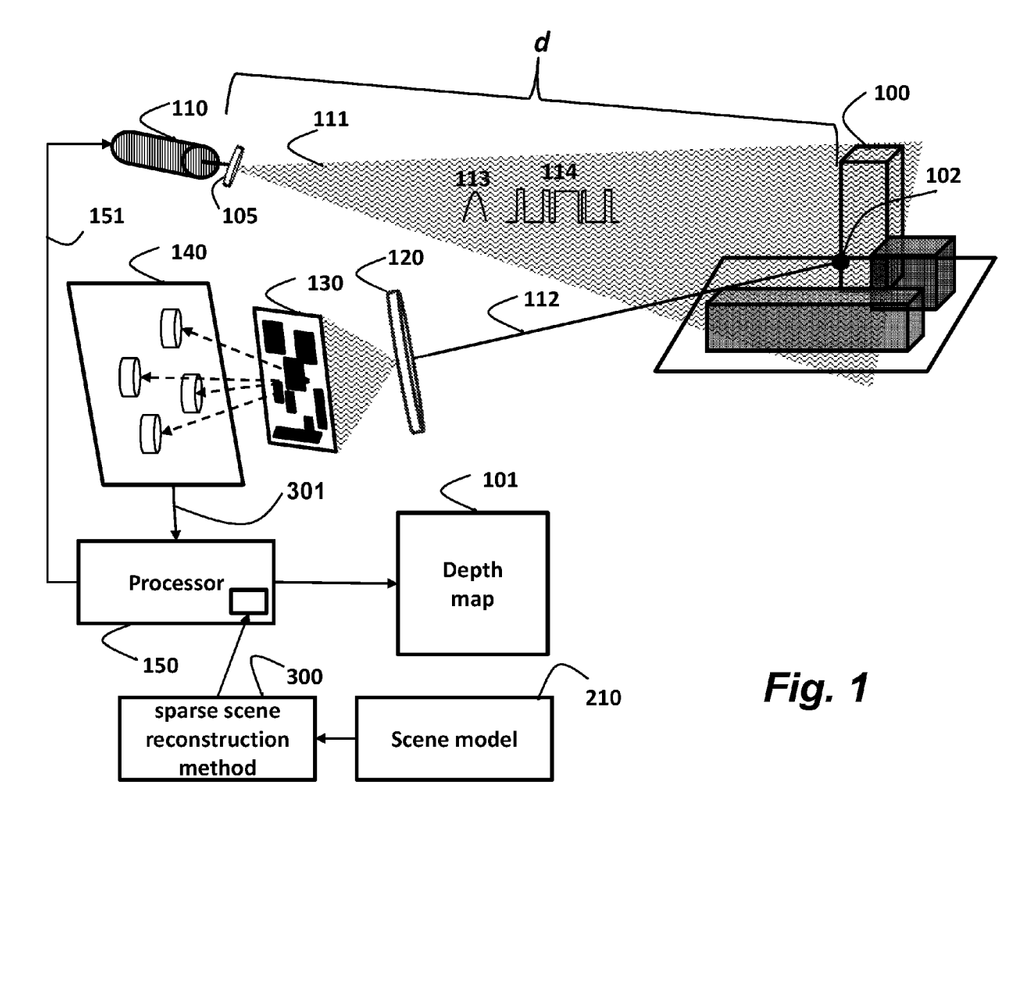
FIG. 1 is a schematic of a scene reconstruction system and method using optical sensing according to embodiments of the invention.

As shown in FIG. 1, a stationary light source 110, e.g., a laser, transmits an optical pulse for each frame to be acquired of a scene 100. A lens turns the pulse into a wide beam pulse 111. By using a wide beam pulse, the scene does not need to be scanned. The pulse can be, for example, Gaussian shaped 113 in time. Alternatively, a coded sequence of pulses 114 can be used.

A reflected pulse 112, from each scene point 102 that is a reflector, passes through a lens 120, which disperses the reflected pulse to a set of sensors 140 arranged in a plane with the light source. This way the total distance is simply 2d. The dispersed pulse passes through a fixed code aperture 130 in the form of a mask in an optical path between the light source and the scene. The mask can be cheaply printed on a transparent material, e.g., an acetate sheet. The mask spatially modulates the dispersed pulse.

In one embodiment, the arrangement of the sensors can be random. In another embodiment, the sensors can be arranged as a uniform array. One advantage of these embodiments, particularly when the cost of optical time-of-flight (TOF) sensors is significant, is that that the number of sensors required is reduced by about 85% when compared with conventional systems, while maining the sensing quality.

The output 301 of the set of sensors is proccessed by a sparse reconstruction method 300 in a processer 150 to obtain a reconstructed scene in a form of a depth map 101 using a scene model. The processor can also control 151 the timing of the pulses transmitted by the light source 110.

Figure 2A:
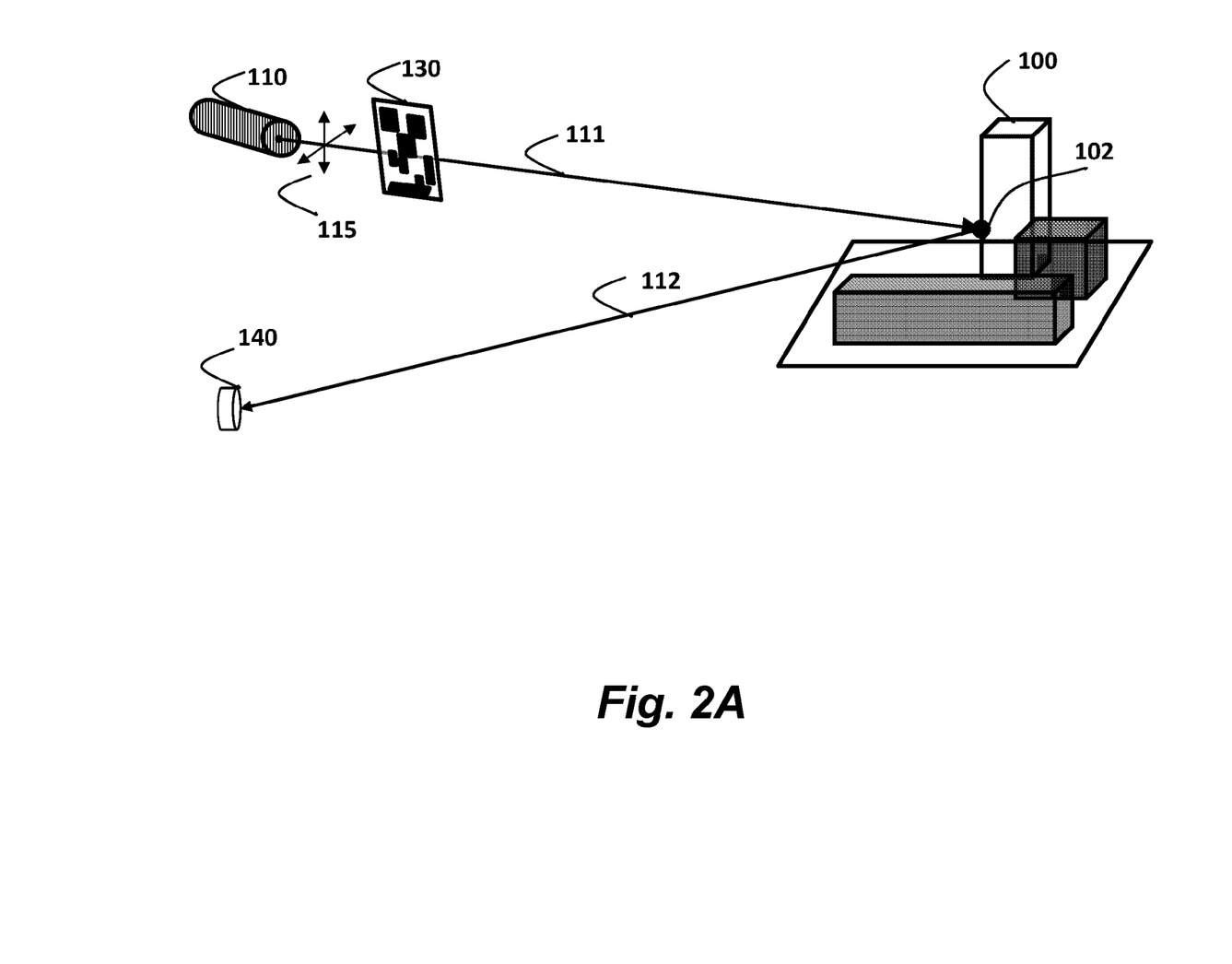
FIG. 2 is a schematic of a scene reconstruction system using optical sensing according another embodiment of the invention.
Figure 2B:
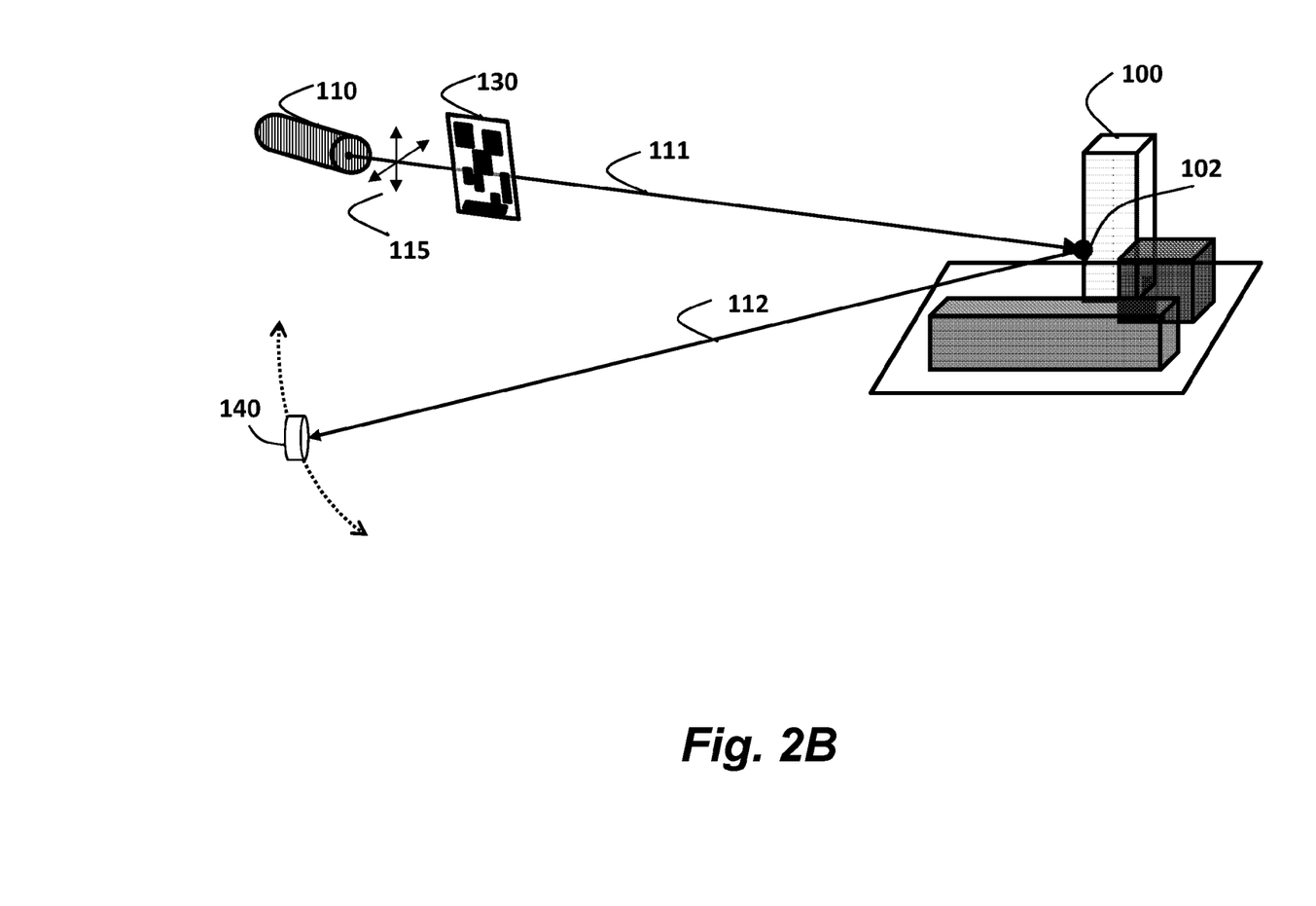

FIG. 2 shows an alternative structure of the system. In this case, the mask 130 is in an optical path between the light source and the scene 100. In this embodiment, the scene is scanned 115 by a nonstationary light source 110, and the set has only one sensor 140. As the light source scans the scene, the source transmits to the scene, through the coded aperture, one pulse at each position in the scanning path 115. Generally, the fixed coded aperture in an optical path between the light source and the set of sensors.

In addition, or alternatively, the sensors can be nonstationary while scanning the scene. An alternative embodiment could combine the two architectures and use both a scanning laser with or without a fixed coded aperture in front of it, combined with multiple sensors behind another fixed coded aperture on the return path of the reflection, with the same or different code.

Reconstruction Method

Figure 3A:
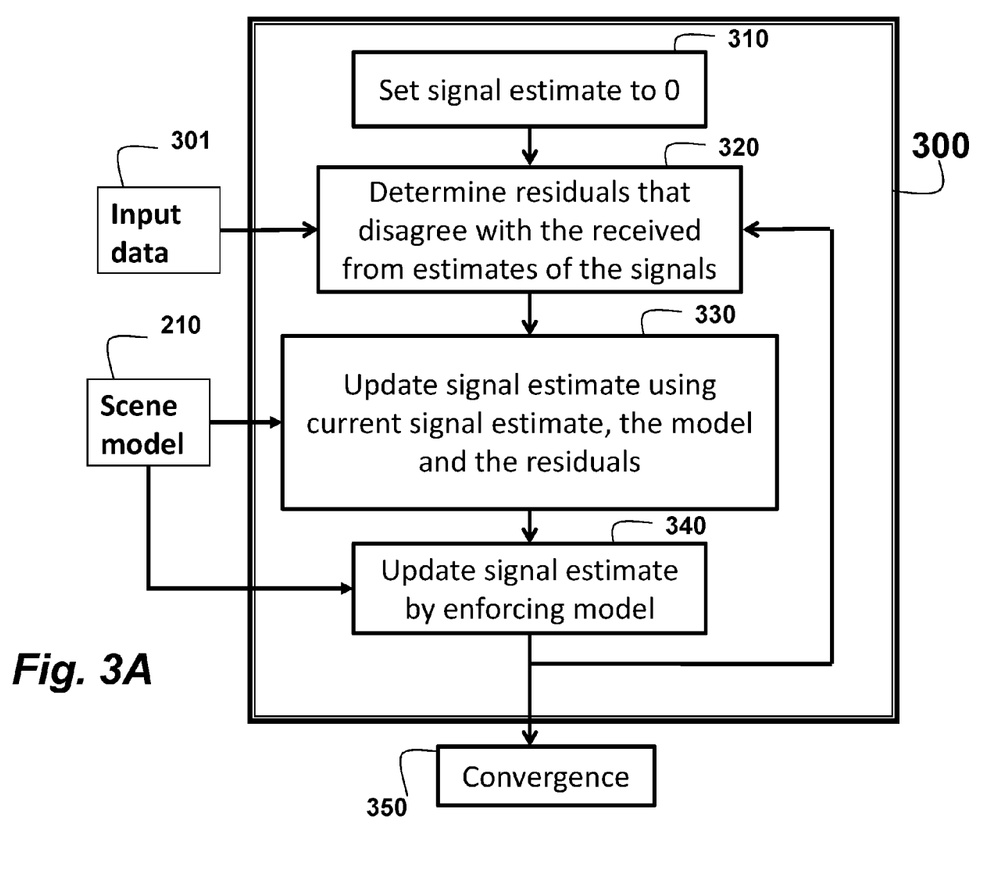
FIG. 3 is a flow diagram of a sparse scene reconstruction method according to embodiments of the invention.
Figure 3B:
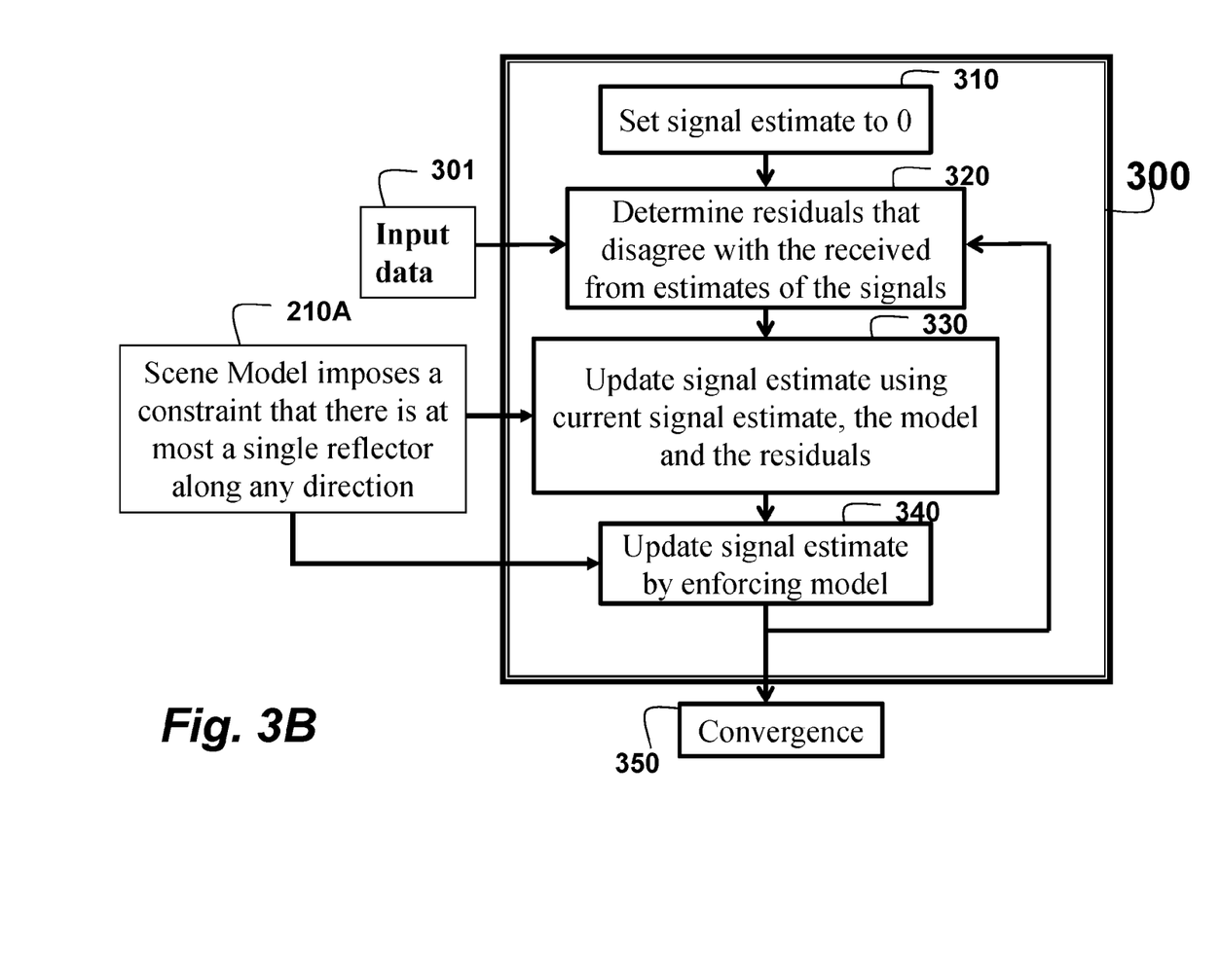
Figure 4:
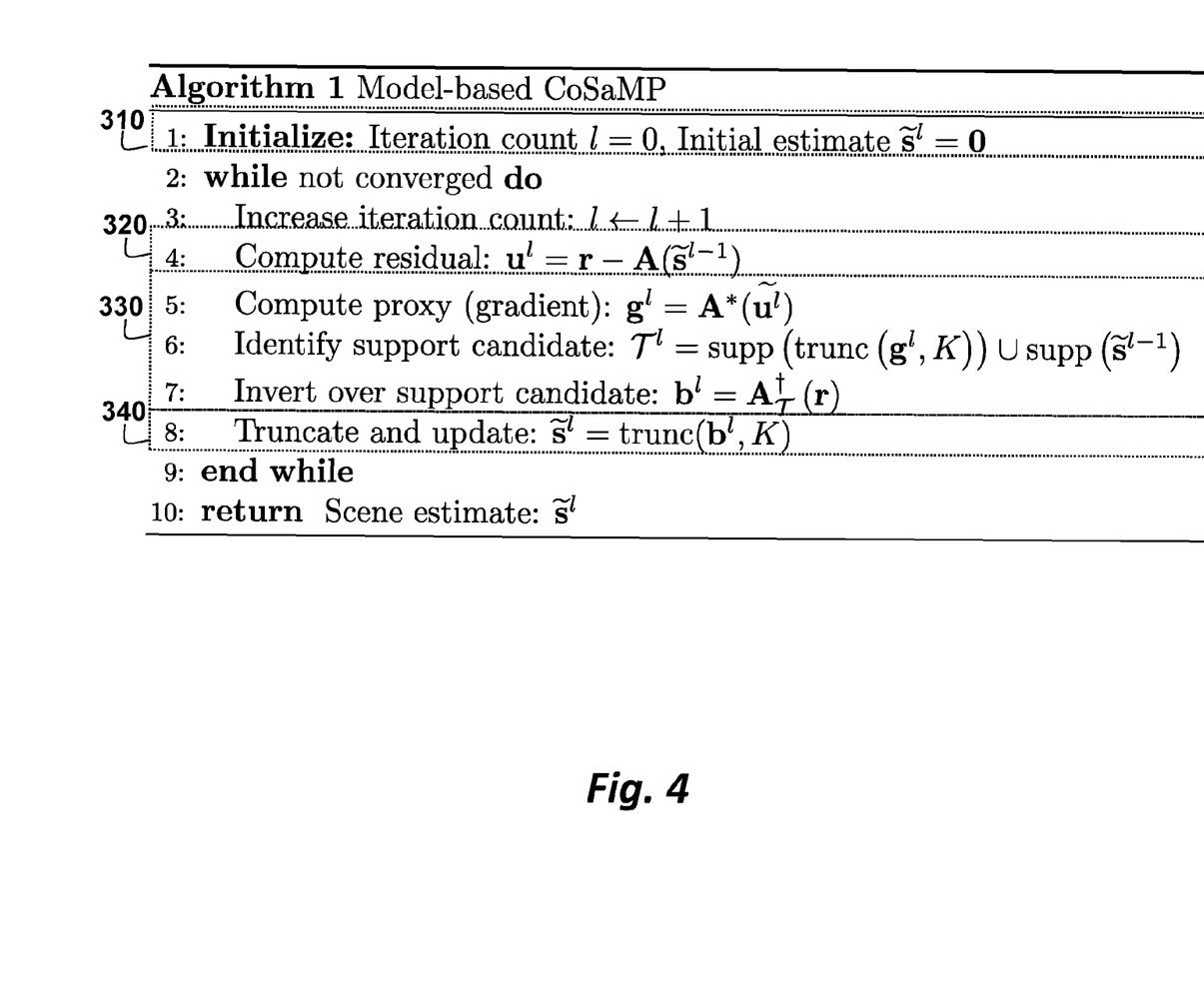
FIG. 4 is a block diagram of pseudo code a model-based CoSaMP reconstruction method according to the invention.
Figure 5:
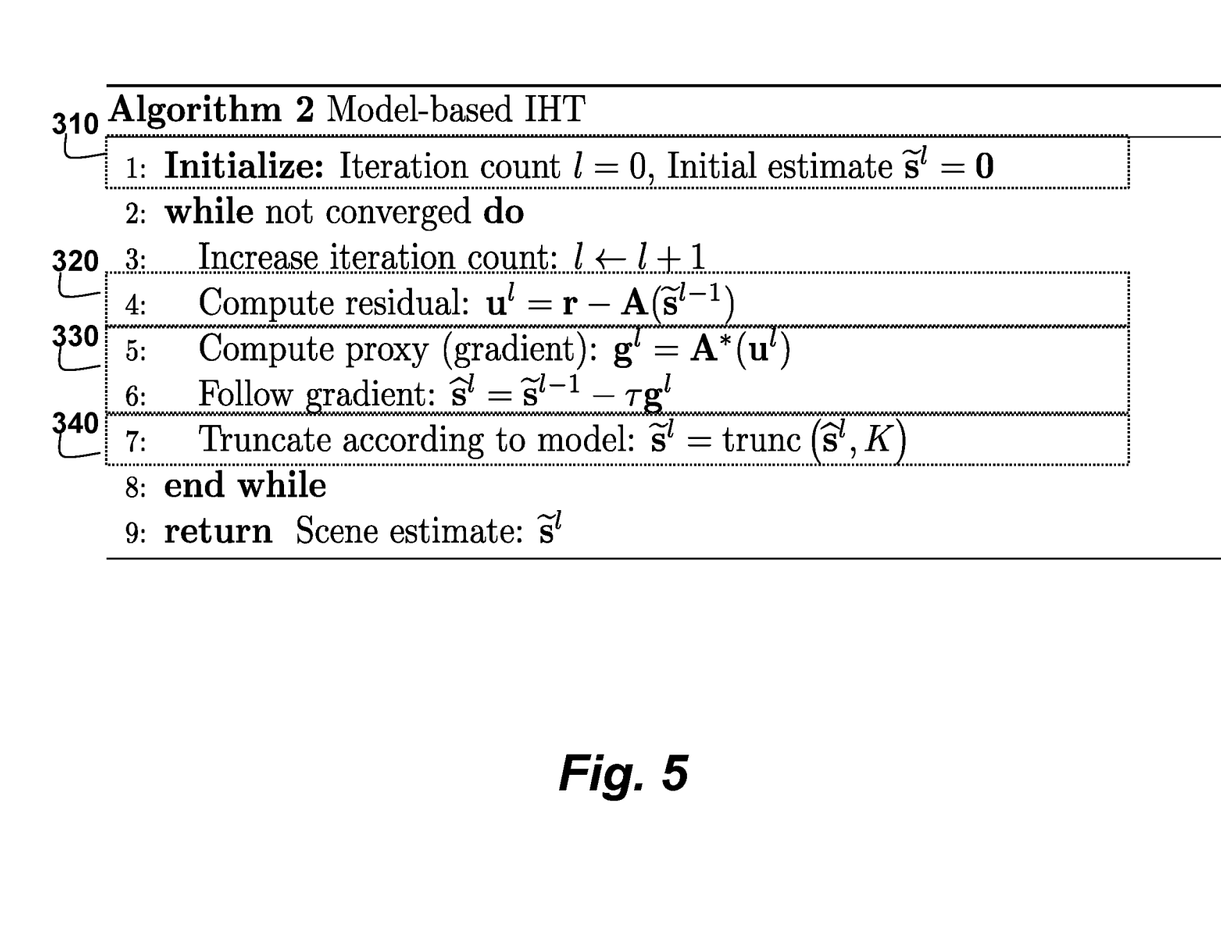
FIG. 5 is a block diagram of pseudo code a model-based IHT CoSaMP reconstruction method according to the invention.

FIG. 3 shows the reconsruction method according to embodiments of the invention. For one embodiment (CoSaMP), the pseudo code for steps 1-10 are shown in FIG. 4. For an alternative embodiment (IHT), the pseudo code for steps 1-9 are shown in FIG. 5. The steps iterate until the estimated signal converges to the depth map 101. The variables used in the pseudo code are described herein.

Initially, the signal estimate is set 310 (step 1) to zero. The input data are in the form of a matrix of acquired signals by the set of sensors 140. Residuals that describe how the input data disagree with the signal estimate are determined 320 (steps 4-6) from signal the estimate and input data (signals).

Next, 330, the signal estimate is updated using the current signal estimate, the signal model, and the residuals. Depending on the reconstruction procedure, the model might or might not be used in this step.

Next, in step 340, the signal estimate is updated by enforcing the scene model 210. The process is repeated from 320 until convergence 350. In one embodiment, the scene model imposes a constraint that there is at most a single reflector along any direction.

Embodiments of the method rely on a K-term truncation step, which can take various forms in different embodiments. For example, the truncation step can be a simple K-sparse approximation, as known in the art, or it can be a selection of the largest in magnitude coefficient, related to a single reflector, along every spatial direction, as described in U.S. patent application Ser. No. 13/405,504. Additionally or alternatively a graph-cuts formulation can be used as described below.

Time-of-Flight

The reconstruction for the depth map is based on time-of-flight (TOF) principles because the sensing of reflected pulse is delayed from the time the pulse is transmitted due to the distance 2d. The delay corresponds to the distance to, or depth of each point 102 in the scene.

Conventional systems must carefully separate and sense the reflected pulses from each direction to determine the TOF and assign the delay to the correct place in the depth map 101.

In contrast, we use compressive sensing (CS) principles and intentionally mix the the reflected pulse in all directions to reduce the sampling burden. Therefore, we rely on computational methods to separate the mixture and assign the correct depth value to each point in the scene.

The fixed coded aperture can be implemented using a mask that blocks light according to, e.g., a binary pattern. In one embodiment the pattern is random. A coded aperture where the pattern has continuous values in a range [0,1] is also possible. The combination of the lens and the coded aperture mixes reflected pulses received from each direction and projects the mixed pulses to the set of sensors. Each sensor receives a different mixture, determined by the aperture code. Thus, the signal acquired by each sensor is a mixture of the reflected pulses, as received by the sensor. These mixtures are used to reconstruct the scene.

In the alternative embodiment, the single sensor receives a different mixtures as the laser with the coded aperture scans the scene. At every point of the scan path of the laser, the scene is illuminated differently, and therefore each reflection acquired by the sensor is a different mixture of the scene.

Signal Model

To model the system, we start with a single reflecting scene point at distance d from the sensing plane, and we assume there is no coded aperture. For convenience, we assume the light source 110 is coplanar with the sensors, although this assumption can be trivially relaxed. Thus, the distance the pulse travels from the light source to the reflecting scene point and back to the sensors is 2d, corresponding to a pulse delay, i.e., TOF, $\tau=2d/c$, where c is the speed of light in the medium. Using this correspondence, time is equivalent to distance from the sensor plane, i.e., depth. Herein, we use distance and depth interchangeably.

We consider a 3-D scene comprising two spatial directions, transverse to the sensor plane, and one depth direction, which we refer to as time or delay, and is perpendicular to the sensor plane. Thus, the scene to be acquire can be represented by a function $s_{x,y,t}$, where s represents the reflectivity of the scene at point (x, y, t). If there is no reflection from a point, then the corresponding reflectivity is zero.

We assume Lambertian surfaces with no transparency, which implies that, for any (x, y) pair, there is only one depth t that has non-zero reflectivity. In other words, if there is a reflection from (x, y, t), then there is no reflector in-between that location and the sensing plane, i.e., in fron of the reflector. Furthermore, the light does not reach any reflectors behind that point for the same (x, y) pair, and, therefore, their reflectivity is also zero. This constraint, in the context of coherent sensing systems, as a depth constraint on s. A valid scene signal s should satisfy this depth constraint.

Given a depth map $d_{x,y}$, representing the depth of the scene at coordinates (x, y), and a reflectivity (albedo) map $a_{x,y}$ for the same coordinates, the scene is can be represented by $$s_{x,y,t}=a_{x,y}\delta_{t-2d_{x,y}/c}, \qquad (2)$$

where $\delta_t$ is the Dirac impulse function. For any scene satisfying the depth constraint, it is trivial to extract depth and albedo maps. In other words, a 3D scene corresponds to a 2D depth map and a 2D albedo map. Similarly, a 2D (one space and one depth dimension) scene corresponds to a 1D depth map and a 1D albedo map.

Acquisition Model

We use $p_t$ to denote the transmitted pulse 111 or pulse sequence to be reflected by the scene 100. Assuming that a pinhole aperture is present, then the received signal for a location (x, y) is $$\hat{r}_{x,y,t}=a_{x,y}p_{t-2d_{x,y}/c}=p_t \circledast_t s_{x,y,t}, \qquad (3)$$

where $\circledast_t$ denotes a linear convolution along the time direction. The coded aperture 130, with spatial code $m_{x,y}$, introduces a mixing of the reflected pulses, which can be shown to be the spatial convolution of $\hat{r}_{x,y,t}$ with the mask. Thus, the received light flux at the sensor plane is $$\tilde{r}_{x,y,t}=m_{x,y} \circledast_{x,y} \hat{r}_{x,y,t}=m_{x,y} \circledast_{x,y} p_t \circledast_t s_{x,y,t}. \qquad (4)$$

This signal is sensed by M sensors, indexed by m=1, ..., M. Each sensor is positioned at location $(x_m, y_m)$. Each sensor samples the light flux at the sensor plane and samples $r_{m,t}=\tilde{r}_{x_m,y_m,t}$ in time.

We discretize the scene to $s \in \mathbb{R}^{N_x,N_y,N_t}$, where $N_x$, $N_y$ is a number of spatial pixels to be acquired, or desired resolution of the system, and $N_t$ is the number of time samples. The discretization is such that each reflector in the scene can be assumed to be approximately flat and parallel to the sensor plane over the area of a pixel, such that the depth constraint is preserved in the discrete representation. This discretization also implies a discretized 2D depth map $d \in \mathbb{R}^{N_x,N_y}$, which also takes discrete values $d_{x,y} \in \{1, \ldots, N_t\}$.

Furthermore, the sampling time is at a rate higher than the Nyquist rate of the transmitted pulses. Similarly, we discretize the pulse, the coded aperture mask, and the received signals, such that the convolution with the pulse and the mask pattern can be expressed in discrete-time.

The linear combination of the discretized received signal $r \in \mathbb{R}^{M,N_t}$ at sensor m can be decomposed as a a sequence of simpler linear transformations $$r=S(M(P(s)))=A(s), \qquad (5)$$

where P, M and S denote, respectively, the linear transformations due to the pulse, the mask of the coded aperture, and the sampling of the optical field by the sensors. Their composition A is the forward linear transformation mapping of the scene s to the received signal r.

While the particular model described the embodiment in FIG. 1, i.e., when the laser is stationary, a very similar linear model can be easily derived that describes other embodiments, such as the embodiment in FIG. 2, in which the laser uses a coded aperture to scan the scene. The reconstruction method only requires that such a linear model exists, which can take a scene s and express the received signal r as a linear transformation, r=A(s), of that scene.

Model Implementation

An efficient computation using the linear model in equation (5) is paramount in modern iterative reconstruction methods. To this end, the operators P and M can be efficiently implemented in a discrete time using fast Fourier transform (FFT) based convolution methods.

Furthermore, S is trivial computationally because it simply selects the appropriate signals. The adjoint A*, necessary for most reconstruction methods, can be implemented by composing the adjoint of each operator in the reverse order, i.e., using A*(r)=P*(M*(S*(r))). This implementation can also exploit the separability of space and time operators in equation (5), and rearrange the linear combinations as S(M(P(s)))=P(S(M(s))) to simplify the complexity. Thus, the pulse convolution P is applied to an $M \times N_t$-dimensional object, rather than a $N_x \times N_y \times N_t$ dimensional object, while the complexity of S and M do not change.

An efficient implementation can use a depth map d and albedo a representation to significantly reduce memory requirements. The forward operator can be determined efficiently from such a representation, although the adjoint requires additional temporary memory to store the entire s.

Depth Reconstruction

Depth Scenes, Variation and Network Flows

To reconstruct a subsampled signal and reduce noise, CS exploits the structure of the acquired signal. In particular, depth maps tend to have a low variation (TV) norm. Signals with low TV norms are generally flat, with very few discontinuities and very few areas with small gradients.

The ($l_1$) TV norm of a discrete map $d \in \mathbb{R}^{N_x \times N_y}$ is defined as $$\|d\|_{TV} = \|\nabla_x d\|_1 + \|\nabla_y d\|_1, \quad (6)$$

where $\nabla_x d$ is a discrete gradient along direction x and $\|\cdot\|_1$ is an element-wise $l_1$ norm of a matrix, i.e., $$\|\nabla_x d\|_1 = \Sigma_{n_y=1}^{N} \Sigma_{n_x=1}^{N-1} |d_{n_x,n_y} - d_{n_x+1,n_y}|, \quad (7)$$

with the y direction similarly defined.

Given a scene satisfying the TV norm depth constraint, an additional constraint on the TV norm of the depth map is equivalent to a constraint on the support of the non-zeros in s. Specifically, two spatially adjacent non-zero coefficients of s, i.e., with respect to the $n_x$ and $n_y$ coordinates, should also have similar depths, i.e., $n_t$ coordinates, except for very few discontinuities. However, this one-to-one correspondence requires that s satisfies the depth constraint. A general dense s does not. Thus, a projection to both the depth and the TV constraints is required for model-based CS methods, such as CoSaMP and IHT.

For a one-dimensional depth map problem, i.e., for a two-dimensional scene $s \in \mathbb{R}^{N_x \times N_t}$ and $d \in \mathbb{R}^{N_x}$, the projections described by Hegde et al., "Approximation-tolerant model-based compressive sensing," Proc. ACM Symposium on Discrete Algorithms (SODA). SIAM, pp. 1544-1561, January 2014 provide a solution. There, 2D signals, represented as a matrix, are considered. Each row of the matrix has only S non-zeros, and the support of those non-zeros from row to row changes very little, according to a pre-determined constraint on the EMD between supports.

It can be shown that with S=1, the EMD constraint applied to s becomes a TV constraint on its support, i.e., the depth map. The projection onto the constraint can be determined using a sequence of dynamic programs solving a network flow problem. Unfortunately, that approach does not generalize to 2D depth maps, i.e., 3D scenes. For those, we use a different formulation.

One formulation that can be used for 3D scenes is described in U.S. patent application Ser. No. 13/405,504, in which the largest in magnitude coefficient along the depth direction is selected for each spatial position x, y. The K largest coefficients and their location are selected among those. One embodiment of the invention can use this formulation. However, this formulation does not enforce a low TV norm constraint in the 2D depth map (i.e., in the support of the non-zeros in the 3D scene).

A different formulation that can enforce this constraint is described next. This is a preferred embodiment of the invention as it enables further reduction of the number of sensors or the laser scanning time, compared to the embodiments using the other formulations.

2D Variation and Graph Cuts

To generalize the projection to 3D objects, i.e., 2D depth maps, we use a graph cut formulation. For an undirected, weighted graph g=(V, E), we consider the general graph cuts problem. That is, given a set of observations X, the task is to assign each vertex $v \in V$ a label $l_v \in L$ such that the joint labeling of all vertices l minimizes an energy function between labels and observations E(l, X).

In our depth sensing method, we map each vertex to represent a spatial location $v=(n_x, n_y)$ of the scene, and each label to represents a discrete depth value $l_v = d_{n_x,n_y}$. Hence, the cardinality of sets V and L are $N_x N_y$ and $N_t$, respectively.

We also map the set of observations X to the scene s. We express the energy function as a sum of unary and pairwise terms $$E(l, s) = -\underbrace{\sum_{v \in V} s_{v,l_v}^2}_{Unary} + \underbrace{\sum_{\substack{v \in V \\ u \in N_v}} \lambda |l_v - l_u|}_{Pairwise}, \quad (8)$$

$$= -\sum_{(n_x, n_y) \in V} s_{n_x,n_y,d_{n_x,n_y}}^2$$

$$+ \sum_{\substack{(n_x, n_y) \in V \\ (n_{x'}, n_{y'}) \in N}} \lambda |d_{n_x,n_y} - d_{n_{x'},n_{y'}}|, \quad (9)$$

where $N_{n_x,n_y} = \{(n_{x+1}, n_y), (n_{x-1}, n_y), (n_x, n_{y+1}), (n_x, n_{y-1})\}$ is the neighborhood of $N_{n_x,n_y}$, i.e., $N_v$ contains all vertices that are directly adjacent to $v=(n_x, n_y)$ in the graph.

The unary term is a fidelity term, which uses the label, i.e., the depth value, to select the appropriate data point from the scene s and impose an $l_2$ data penalty. The pairwise term imposes a smoothness constraint between the label of v and the label of vertices in the neighborhood set $N_v$. Thus, the pairwise term from equation (8) is the $l_1$ norm of the gradient of depth values, i.e., the TV norm of d. Analogous to Rudin-Osher-Fatemi total variation, the parameter $\lambda$ represents a tradeoff between data fidelity and smoothness.

Solvers for minimizing equation (8) that are well known include alpha-expansion and alpha-beta swap, as well as Boolean approaches. In one embodiment, we use an alpha-expansion technique.

The truncation step (6, 8 in FIG. 4, and 8 in FIG. 5) of our model-based method incorporates a K-term truncation of s by first optimizing equation (8) to obtain a candidate depth map d, which corresponds to a candidate support set ($n_x, n_y, d_{n_x,n_y}$). From this candidate support set, the largest K components of s are selected to be used by an appropriate step of model-based CoSaMP or IHT.

In contrast, conventional truncation just selects the K largest components of the data s not constrained by the graph cuts solution. Compared to conventional sparsity, our model-based thresholding produces a scene s that satisfies the depth and TV constraints.

Scene Reconstruction

Given a projection, such as the one described above, it can be incorporated to a reconstruction algorithm to recover the actual depth map. Two alternative embodiments are demonstrated in FIGS. 4 and 5.

In FIG. 4, an iterative algorithm to perform reconstruction is described, based on model-based CoSaMP (compressive sampling matching pursuit). An iteration count l and a signal estimate $\tilde{s}^l$ are maintained and updated throughout each iteration. Step 1 initializes them to 0. Step 3 increases the iteration count. Step 4 computes a residual $u^l$, which captures the disagreement of the signal estimate $\tilde{s}^{l-1}$ with the data r. A proxy $g^l$ for the scene is computed in Step 5, which is also the gradient of a cost function at the current scene estimate $\tilde{s}^{l-1}$. Step 6 uses a model-based truncation function such as the one described above to determine the support of the proxy, truncated to K coefficients according to the model, denoted supp(trunc($g^l$, K)). Note that alternative embodiments could use a different truncation length such as 2K or K/2. This support is united with supp($\tilde{s}^{l-1}$), the support of the current signal estimate to form a support candidate $\tau^l$. A new temporary signal estimate $b^l$ is formed in Step 7 by inverting the system restricted over the support candidate. The temporary signal estimate is truncated in step 8 to update the signal estimate $\tilde{s}^l$. Steps 3-8 are iterated until the converged of the algorithm or for a finite number of iterations. Convergence can be measured, for example, by the magnitude of the residual computed in step 4, or by the amount of change in the signal estimate $\tilde{s}^l$ from iteration to iteration. The final signal estimate after convergence, $\tilde{s}^l$, is returned at Step 10.

In FIG. 5, an alternative iterative algorithm to perform reconstruction is described, based on model-based IHT (iterative hard thresholding). An iteration count l and a signal estimate $\tilde{s}^l$ are maintained and updated throughout each iteration. Step 1 initializes them to 0. Step 3 increases the iteration count. Step 4 computes a residual $u^l$, which captures the disagreement of the signal estimate $\tilde{s}^{l-1}$ with the data r. A proxy $g^l$ for the scene is computed in Step 5, which is also the gradient of a cost function at the current scene estimate $\tilde{s}^{l-1}$. An alternative temporary scene estimate $\hat{s}^l$ is formed in Step 6, by following the gradient with a step size $\tau$. The temporary signal estimate is truncated in step 7 to update the signal estimate $\tilde{s}^l$. Steps 3-8 are iterated until the converged of the algorithm or for a finite number of iterations. Convergence can be measured, for example, by the magnitude of the residual computed in step 4, or by the amount of change in the signal estimate $\tilde{s}^l$ from iteration to iteration. The final signal estimate after convergence, $\tilde{s}^l$, is returned at Step 9.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for reconstructing a scene, comprising:
   a light source configured to transmit an optical pulse unto the scene;
   a set of sensors configured to receive a reflected pulse to acquire sensed signals according to a time profile of the reflected pulse, corresponding to the optical pulse;
   a fixed coded aperture in an optical path between the scene and set of sensors; and
   a processor, connected to the light source and the set of sensors, configured to perform a method to reconstruct the scene, from the sensed signals, as a three-dimensional (3D) depth map using a scene model.

2. The system of claim 1, wherein the fixed coded aperture is between the light source and the scene.

3. The system of claim 1, wherein the fixed coded aperture is between the scene and the set of sensors, such that the set of sensors are light-based time-of-flight (TOF) depth sensors.

4. The system of claim 1, wherein there is one optical pulse for each 3D depth map in a sequence of depth maps.

5. The system of claim 1, wherein the optical pulse is a wide beam optical pulse.

6. The system of claim 1, wherein the optical pulse is Gaussian shaped in time.

7. The system of claim 1, wherein the optical pulse includes a coded sequence of pulses.

8. The system of claim 1, wherein an arrangement of the set of sensors is random and coplanar with the light source.

9. The system of claim 1, wherein an arrangement of the set of sensors forms a uniform array.

10. The system of claim 1, wherein the processing uses a sparse reconstruction system.

11. The system of claim 1, wherein the processing uses a model-based sparse reconstruction system.

12. The system of claim 1, wherein the light source is nonstationary, and the nonstationary light source scans the scene.

13. The system of claim 1, wherein the sensors in the set are nonstationary and the set of sensors scan the scene.

14. The system of claim 1, wherein a pattern of the fixed code aperture is random.

15. The system of claim 11, wherein the pattern has binary values.

16. The system of claim 11, wherein the pattern has continuous values.

17. The system of claim 1, wherein a signal received at each sensor is a linear combination of a 3D representation of the scene.

18. The system of claim 17, wherein the linear combination is decomposed to a sequence of simpler linear combinations.

19. The system of claim 18, wherein some of the simpler linear combinations are implemented in a discrete time using fast Fourier transform (FFT) based convolution systems.

20. The system of claim 17, wherein some the linear combinations are rearranged.

21. The system of claim 1, wherein the scene model imposes a constraint on the 3D depth map.

22. The system of claim 21, wherein the constraint on the 3D depth map is a total variation (TV) constraint.

23. The system of claim 22, wherein a projection onto the TV constraint is determined by solving a network flow problem.

24. The system of claim 1, wherein the scene model imposes a constraint that there is at most a single reflector along any direction.

25. A method for reconstructing a scene, comprising steps of:
   transmitting, by a light source, an optical pulse unto the scene;
   receiving a reflected pulse at a set of sensors to acquire sensed signals according to a time profile of the reflected pulse, corresponding to the optical pulse, wherein there is a fixed coded aperture in an optical path between the scene and the set of sensors; and processing the sensed signals to reconstruct the scene as a three-dimensional (3D) depth map using a scene model.

26. The system of claim 1, wherein a distance the optical pulse travels from the light source to the scene and back to the set of sensors is a pulse delay or a light-based time-of-flight (TOF), such that the TOF is configured to have a time equivalent to a distance from a sensor plane or a sensor depth.

27. A method for reconstaiding a scene, comprising;
- transmitting, by a light source, an optical pulse for each frame sequenced in time unto the scene, wherein a processor controls a timing of the pulses transmitted by the light source;
- receiving a reflected pulse at a set of time-of-flight (TOF) sensors arranged in a plane with the light source to acquire sensed signals according to a time profile of the reflected pulse, corresponding to the optical pulse, wherein there is a fixed coded aperture in an optical path between the scene and the set of TOF sensors; and
- processing the sensed signals to reconstruct the scene as a three-dimensional (3D) depth map using a scene model.

* * * * *